United States Patent
Islam

(10) Patent No.: US 11,056,842 B2
(45) Date of Patent: Jul. 6, 2021

(54) JUMPER CABLE WITH CAPACITIVE POWER ENHANCEMENT AND/OR OVERVOLTAGE PROTECTION

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 322 days.

(21) Appl. No.: 16/157,549

(22) Filed: Oct. 11, 2018

(65) Prior Publication Data

US 2019/0140402 A1 May 9, 2019

Related U.S. Application Data

(60) Provisional application No. 62/574,941, filed on Oct. 20, 2017.

(51) Int. Cl.

| | |
|---|---|
| *H01B 7/04* | (2006.01) |
| *H01G 4/00* | (2006.01) |
| *H04W 52/00* | (2009.01) |
| *H01R 13/66* | (2006.01) |
| *H01B 7/18* | (2006.01) |
| *G02B 6/44* | (2006.01) |
| *H04W 88/08* | (2009.01) |

(52) U.S. Cl.
CPC ....... *H01R 13/6625* (2013.01); *G02B 6/4416* (2013.01); *H01B 7/04* (2013.01); *H01B 7/185* (2013.01); *H01G 4/00* (2013.01); *H01R 13/6666* (2013.01); *H04W 52/00* (2013.01); *H04W 88/085* (2013.01)

(58) Field of Classification Search
CPC ............ H01R 13/6625; H01R 13/6666; G02B 6/4416; H01B 7/04; H01B 7/185; H01G 4/00; H04W 52/00; H04W 88/085
USPC ........................................................ 361/91.1
See application file for complete search history.

(56) References Cited

U.S. PATENT DOCUMENTS

| | | | | |
|---|---|---|---|---|
| 4,270,828 A | * | 6/1981 | Thurston | H01R 4/2495 439/442 |
| 5,971,553 A | * | 10/1999 | Durnwald | B60R 1/04 359/871 |
| 6,185,086 B1 | * | 2/2001 | Tanaka | H01G 4/228 361/301.1 |
| 8,948,557 B2 | * | 2/2015 | Islam | G02B 6/443 385/107 |
| 9,281,866 B2 | * | 3/2016 | Smentek | H04W 52/0206 |
| 9,759,880 B2 | | 9/2017 | Chamberlain et al. | |
| 2013/0336622 A1 | * | 12/2013 | Islam | G02B 6/4471 385/100 |
| 2014/0138151 A1 | * | 5/2014 | Islam | G02B 6/4471 174/71 R |

(Continued)

*Primary Examiner* — Timothy J Thompson
*Assistant Examiner* — Michael F McAllister
(74) *Attorney, Agent, or Firm* — Myers Bigel, P.A.

(57) ABSTRACT

A hybrid jumper cable includes: a pair of power conductors; a pair of optical fibers; a jacket surrounding the pair of power conductors and the pair of optical fibers; a hybrid connector connected with the pair of power conductors and the pair of optical fibers; a capacitor electrically connected to each of the pair of power conductors; and a conduit attached to the hybrid connector, the capacitor residing in the conduit.

17 Claims, 8 Drawing Sheets

(56) References Cited

U.S. PATENT DOCUMENTS

| | | | |
|---|---|---|---|
| 2014/0140664 A1* | 5/2014 | Islam | G02B 6/4471 |
| | | | 385/86 |
| 2014/0140671 A1* | 5/2014 | Islam | G02B 6/4471 |
| | | | 385/101 |
| 2015/0080055 A1* | 3/2015 | Smentek | H04B 3/44 |
| | | | 455/561 |
| 2015/0155669 A1* | 6/2015 | Chamberlain | G02B 6/4284 |
| | | | 455/561 |
| 2015/0226927 A1* | 8/2015 | Islam | G02B 6/4416 |
| | | | 385/101 |

* cited by examiner

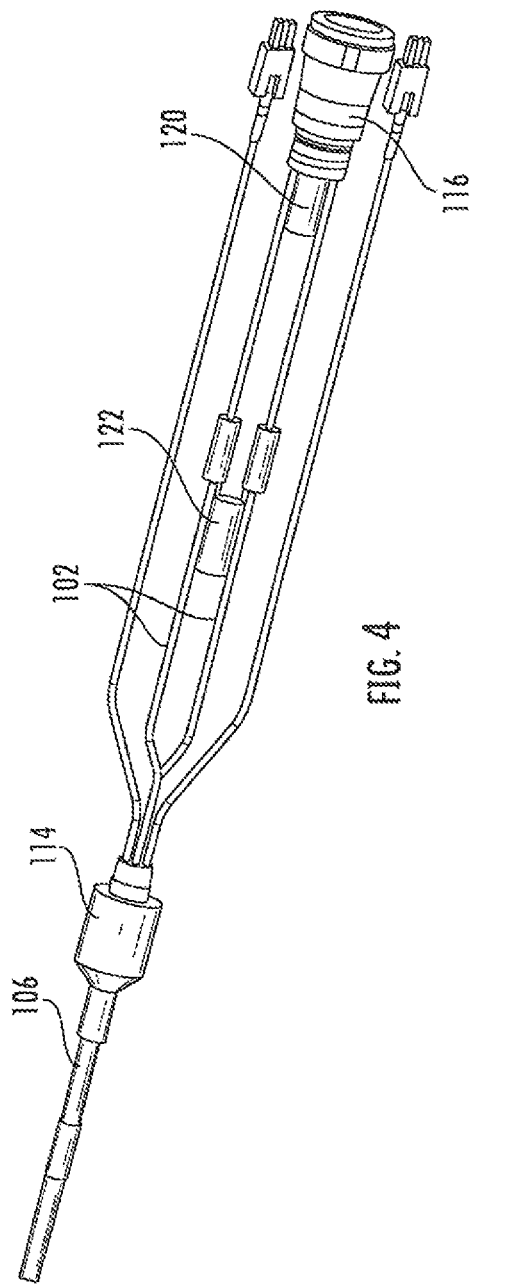
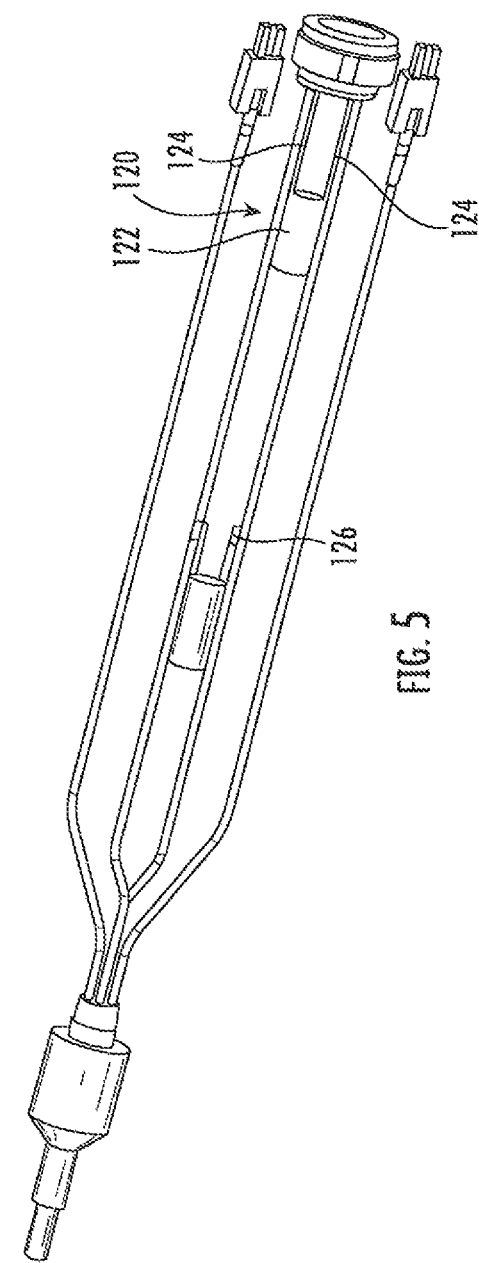
FIG. 4
FIG. 5

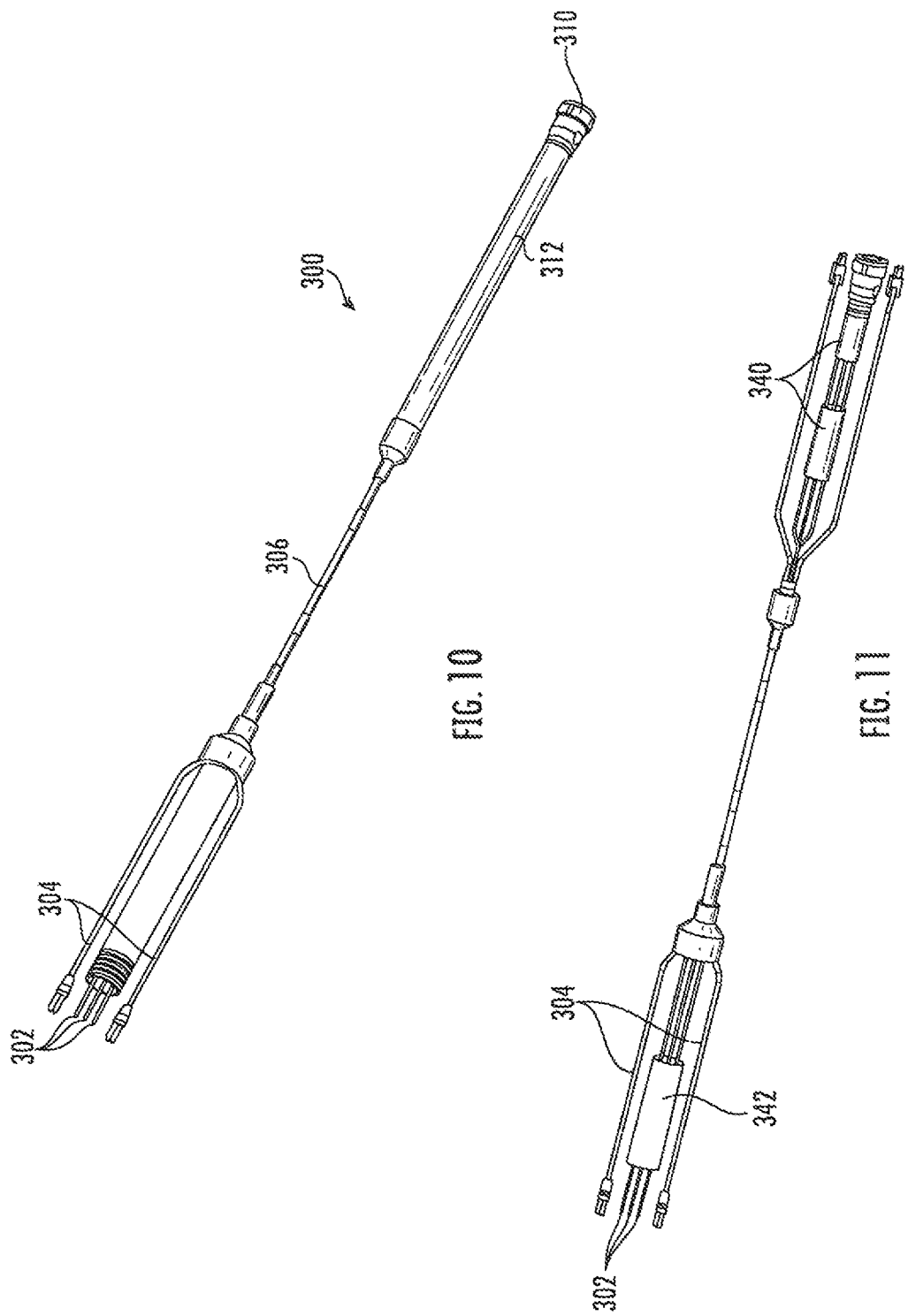

JUMPER CABLE WITH CAPACITIVE POWER ENHANCEMENT AND/OR OVERVOLTAGE PROTECTION

RELATED APPLICATION

The present application claims priority from and the benefit of U.S. Provisional Patent Application No. 62/574,941, filed Oct. 20, 2017, the disclosure of which is hereby incorporated herein by reference in its entirety.

FIELD OF THE INVENTION

The present invention relates generally to remote radio heads, and more particularly to delivering power to remote radio heads at the top of antenna towers and/or in other locations that are remote from a power supply.

BACKGROUND

Cellular base stations typically include, among other things, a radio, a baseband unit, and one or more antennas. The radio receives digital information and control signals from the baseband unit and modulates this information into a radio frequency ("RF") signal that is then transmitted through the antennas. The radio also receives RF signals from the antenna and demodulates these signals and supplies them to the baseband unit. The baseband unit processes demodulated signals received from the radio into a format suitable for transmission over a backhaul communications system. The baseband unit also processes signals received from the backhaul communications system and supplies the processed signals to the radio. A power supply is provided that generates suitable direct current ("DC") power signals for powering the baseband unit and the radio. The radio is often powered by a (nominal) −48 Volt DC power supply.

In order to increase coverage and signal quality, the antennas in many cellular base stations are located at the top of a tower, which may be, for example, about fifty to two hundred feet tall. In early cellular systems, the power supply, baseband unit and radio were all located in an equipment enclosure at the bottom of the tower to provide easy access for maintenance, repair and/or later upgrades to the equipment. Coaxial cable(s) were routed from the equipment enclosure to the top of the tower that carried signal transmissions between the radio and the antennas. However, in recent years, a shift has occurred and the radio is now more typically located at the top of the antenna tower and referred to as a remote radio head ("RRH"). Using remote radio heads may significantly improve the quality of the cellular data signals that are transmitted and received by the cellular base station, as the use of remote radio heads may reduce signal transmission losses and noise. In particular, as the coaxial cable runs up the tower may be 100-200 feet or more, the signal loss that occurs in transmitting signals at cellular frequencies (e.g., 1.8 GHz, 3.0 GHz, etc.) over the coaxial cable may be significant. Because of this loss in signal power, the signal-to-noise ratio of the RF signals may be degraded in systems that locate the radio at the bottom of the tower as compared to cellular base stations where remote radio heads are located at the top of the tower next to the antennas (note that signal losses in the cabling connection between the baseband unit at the bottom of the tower and the remote radio head at the top of the tower may be much smaller, as these signals are transmitted at baseband or as optical signals on a fiber optic cable and then converted to RF frequencies at the top of the tower).

FIG. 1 schematically illustrates a conventional cellular base station 10 in which the radios are implemented as remote radio heads. As shown in FIG. 1, the cellular base station 10 includes an equipment enclosure 20 and a tower 30. The equipment enclosure 20 is typically located at the base of the tower 30, and a baseband unit 22 and a power supply 26 are located within the equipment enclosure 20. The baseband unit 22 may be in communication with a backhaul communications system 28. A plurality of remote radio heads 24 and a plurality of antennas 32 (e.g., three sectorized antennas 32) are located at the top of the tower 30. While the use of tower-mounted remote radio heads 24 may improve signal quality, it also requires that DC power be delivered to the top of the tower 30 to power the remote radio heads 24.

A fiber optic cable 38 connects the baseband unit 22 to the remote radio heads 24, as fiber optic links may provide greater bandwidth and lower loss transmissions. A power cable 36 is also provided for delivering the DC power signal up the tower 30 to the remote radio heads 24. The power cable 36 may include a first insulated power supply conductor and a second insulated return conductor. The fiber optic cable 38 and the power cable 36 may be provided together in a hybrid power/fiber optic cable 40 (such hybrid cables that carry power and data signals up an antenna tower are commonly referred to as "trunk" cables). The trunk cable 40 may include a plurality of individual power cables that each power a respective one of the remote radio heads 24 at the top of the antenna tower 30. The trunk cable 40 may include a breakout enclosure 42 at one end thereof (the end at the top of the tower 30). Individual optical fibers from the fiber optic cable 38 and individual conductors of the power cable 36 are separated out in the breakout enclosure 42 and connected to the remote radio heads 24 via respective breakout cords 44 (which may or may not be integral with the trunk cable 40) that run between the remote radio heads 24 and the breakout enclosure 42. Stand-alone breakout cords 44 are typically referred to as "jumper cables" or "jumpers." Coaxial cables 46 are used to connect each remote radio head 24 to a respective one of the antennas 32.

As discussed in co-pending and co-assigned U.S. Patent Publication No. 2015/0155669 to Chamberlain (the disclosure of which is hereby incorporated herein in its entirety), there may be performance advantages (particularly in power enhancement) in introducing capacitive arrangements to the power circuits at the top of the tower, particularly with jumper cables.

SUMMARY

As a first aspect, embodiments of the invention are directed to a hybrid jumper cable, comprising: a pair of power conductors; a pair of optical fibers; a jacket surrounding the pair of power conductors and the pair of optical fibers; a hybrid connector connected with the pair of power conductors and the pair of optical fibers; a capacitor electrically connected to each of the pair of power conductors; and a conduit attached to the hybrid connector, the capacitor residing in the conduit.

As a second aspect, embodiments of the invention are directed to a jumper cable, comprising: a pair of power conductors; a jacket surrounding the pair of power conductors; a connector connected with the pair of power conductors; a capacitor electrically connected to each of the pair of power conductors; and a conduit attached to the connector, the conduit having a diameter greater than a diameter of the jacket, the capacitor residing in the conduit.

As a third aspect, embodiments of the invention are directed to a jumper cable, comprising: a pair of power conductors; a jacket surrounding the pair of power conductors; a connector connected with the pair of power conductors; an overvoltage device electrically connected to each of the pair of power conductors; and a conduit attached to the connector, the overvoltage device residing in the conduit.

BRIEF DESCRIPTION OF THE FIGURES

FIG. 4 is an enlarged, partial perspective view of the hybrid jumper cable of FIG. 2 with the flexible conduit and ruggedized sleeve removed.

FIG. 5 is an enlarged, partial perspective view of the hybrid jumper cable of FIG. 2 with the flexible conduit, ruggedized sleeve and back body of the connector removed.

FIG. 10 is a perspective view of a hybrid jumper cable according to embodiments of the invention that includes both a capacitor and an overvoltage protection (OVP) unit.

FIG. 11 is a perspective view of the hybrid jumper cable of FIG. 10 with the outer conduit removed.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
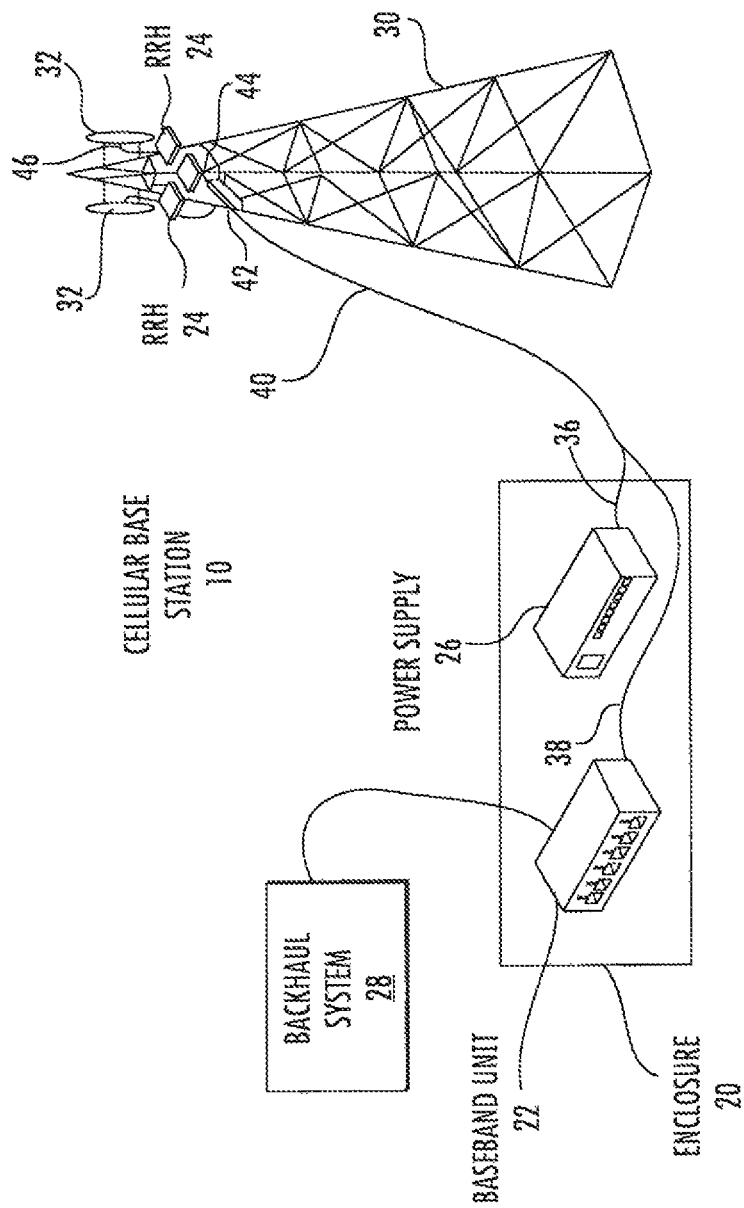
FIG. 1 is a simplified, schematic view of a conventional cellular base station in which several remote radio heads are located at the top of an antenna tower.
Figure 2:
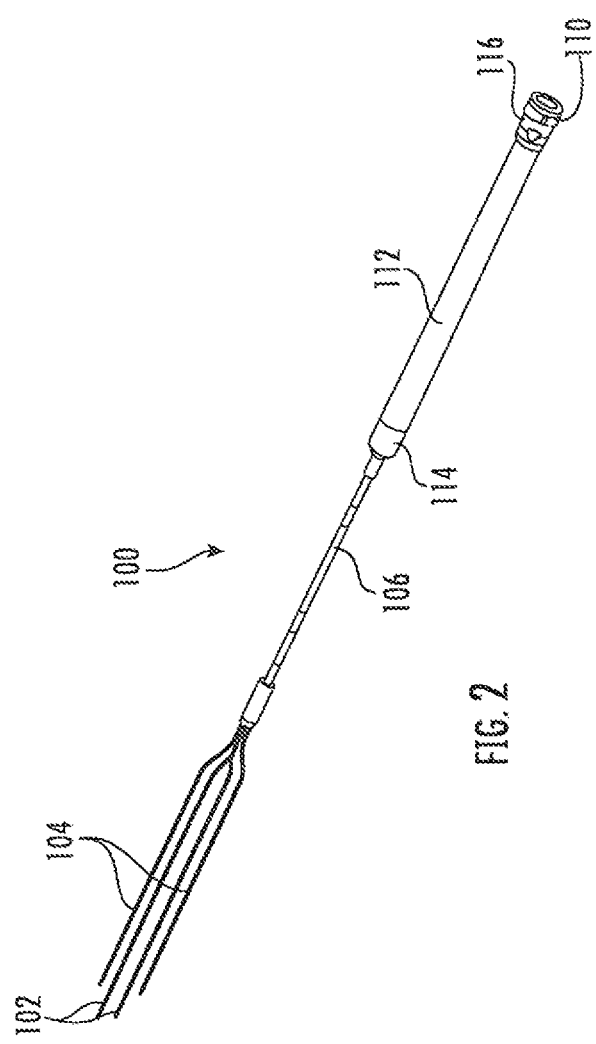
FIG. 2 is a perspective view of a hybrid jumper cable according to embodiments of the invention.

Referring now to the figures, a hybrid jumper cable, designated broadly at 100, is shown in FIG. 2. The hybrid jumper cable 100 includes two power conductors 102 and two optical fibers 104 residing within a jacket 106. The power conductors 102, the optical fibers 104 and the jacket 106 may be of conventional construction and need not be described in detail herein. Typically, the jumper cable 100 is between about 1 and 15 meters in length.

At one end the hybrid jumper cable 100 includes a hybrid connector 110 that is configured to attach to a mating connector on an RRU or the like. The hybrid connector 110 may be of conventional construction and has both power and fiber ports or terminals. The conductors 102 are attached to the power ports of the hybrid connector 110 as shown in, for example, FIG. 5. The optical fibers 104 are attached to the fiber ports of the hybrid connector 110, but for clarity these connections are not shown herein.

In some embodiments the opposite end of the hybrid jumper cable 100 will include an identical or similar hybrid connector 110. In other embodiments other styles of connectors may be employed as needed by the equipment to be connected with the hybrid jumper cable 100.

Figure 3:
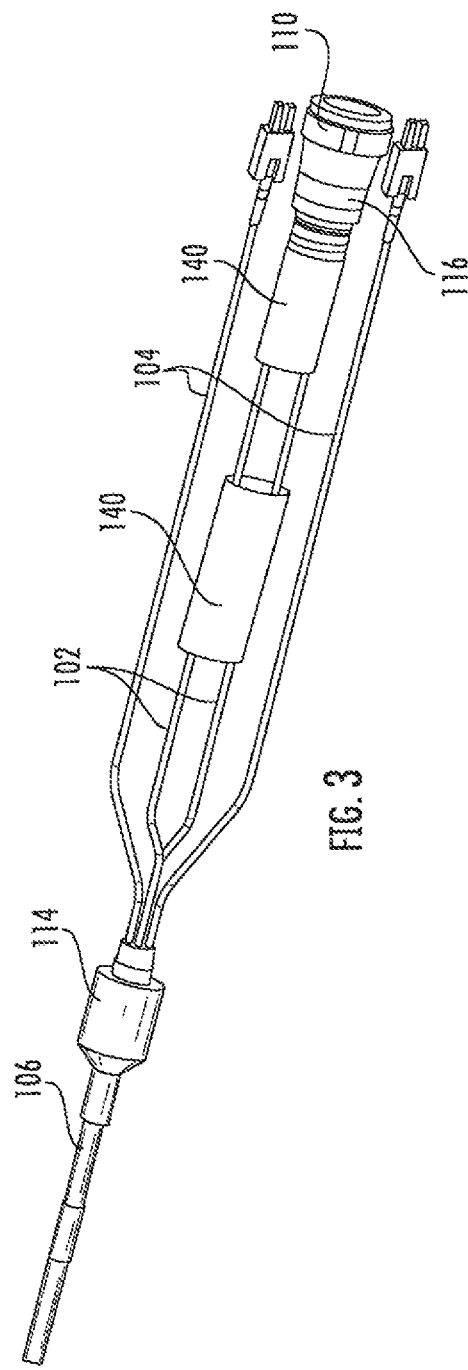
FIG. 3 is an enlarged, partial perspective view of the hybrid jumper cable of FIG. 2 with the flexible conduit removed.

As shown in FIGS. 4 and 5, the hybrid jumper cable 100 also includes two capacitors 120 that are connected between the power conductors 102. These capacitors can provide power enhancement as discussed in U.S. Patent Publication No. 2015/0155669, supra. As shown in FIG. 2, the capacitors 120 are housed within a flexible conduit 112 (which may be formed of a polymeric material that may include a metallic shield, may be metallic, and/or may be armored or braided). At one end, the conduit 112 is received within a funnel-shaped transition housing 114 that seals the conduit 112 against the jacket 106. At its opposite end, the conduit 112 meets the back body 116 of the hybrid connector 110. Typically, and as shown, the conduit 112 has a greater diameter than the jacket 106. As such, the conduit 112 provides an environmentally-protected space of greater volume for the power conductors 102, the optical fibers 104 and the capacitors 120. As seen in FIG. 3, in some embodiments a ruggedized tube (e.g., a heat shrink tube 140) may surround the capacitors 120 and their connections with the conductors 102 to provide additional protection from the environment and mechanical stresses.

Figure 6:
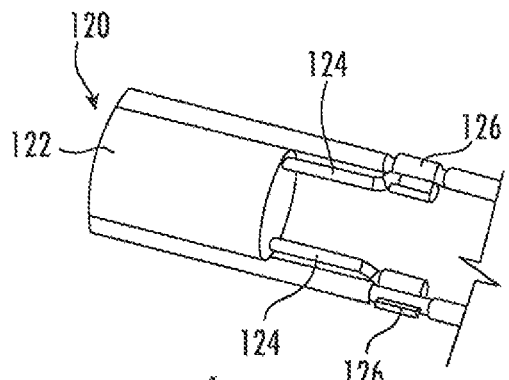
FIG. 6 is a greatly enlarged perspective view of one capacitor and two conductors of the hybrid jumper cable of FIG. 2.

Referring now to FIGS. 4-6, the capacitors 120 include a body 122 and elongate contacts 124 that extend from one end of the body 122. Each of the contacts 124 of the capacitors 120 is electrically connected with a respective power conductor 102, such that the body 122 of the capacitor 120 is positioned between the conductors 102. As shown in FIGS. 5 and 6, the connections between the capacitor contacts 124 and the conductors 102 are achieved by clips 126 (such as C-crimp clips) or other fasteners and may be protected by a heat shrink tube, a crimp sleeve/shrink tube, or similar insulation.

The capacitors 120 may be of any conventional form. As an example, for a jumper cable having two capacitors as shown herein, each capacitor may be rated at 1,500 to 3,000 µF at 100V).

Figure 7:
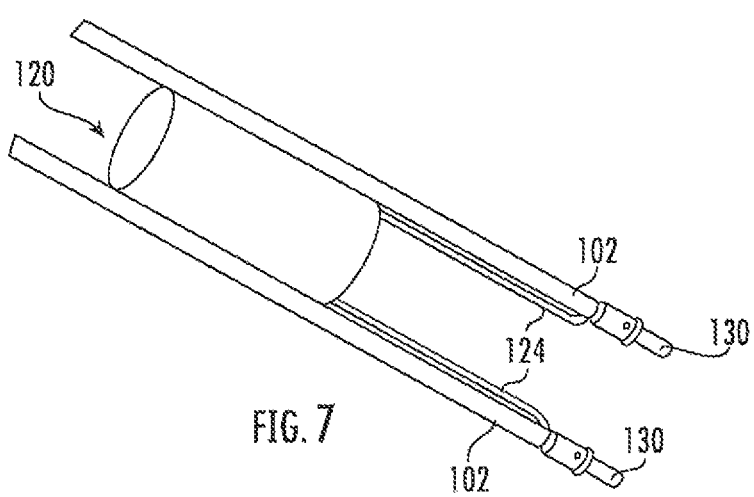
FIG. 7 is a greatly enlarged perspective view of a capacitor of the hybrid jumper cable of FIG. 2 showing the capacitor contacts terminated with the power terminals of the connector.
Figure 8:
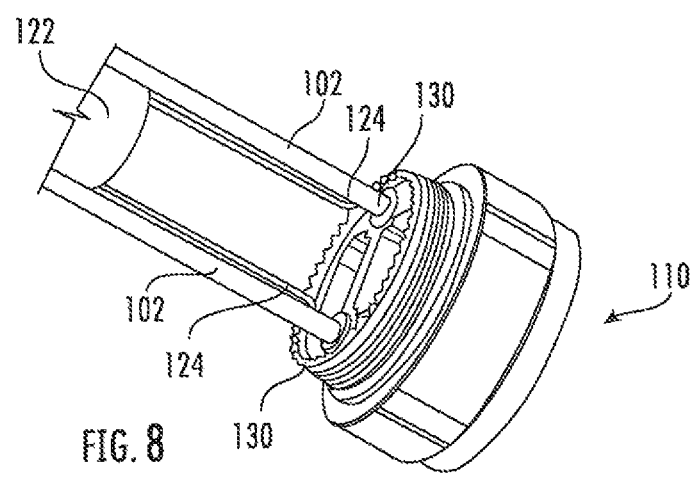
FIG. 8 is a greatly enlarged perspective view of the hybrid connector of the hybrid jumper cable of FIG. 2.

It can also be seen in FIG. 4 that one of the capacitors 120 may reside partially within the back body 116 of the hybrid connector 110. Under such circumstances, as shown in FIG. 7, a power terminal 130 of the hybrid connector 110 may be crimped or otherwise directly connected with the contact 124 of the capacitor 120. The crimped power terminal 130, capacitor contact 124 and conductor 102 can then be mounted in the hybrid connector 110 (see FIG. 8).

As can be envisioned from examination of FIGS. 2-4, the optical fibers 104 are routed from the transition housing 114 within the conduit 112 and to the hybrid connector 110.

In this arrangement, the hybrid jumper cable 100 can include capacitors 120 that can provide power enhancement and that are environmentally protected by the conduit 112 while still being sufficiently flexible for easy handling at the top of an antenna tower.

Figure 9:
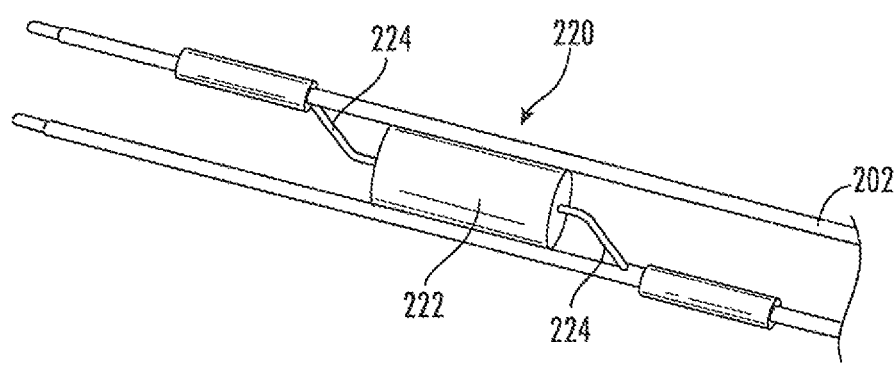
FIG. 9 is greatly enlarged perspective view of a capacitor and conductors for a hybrid jumper cable according to alternative embodiments of the invention.

Referring now to FIG. 9, an alternative arrangement of power conductors 202 and capacitors 220 is shown therein. The capacitor 220 illustrated has a body 222 and contacts 224 that exit opposite ends of the body 222. The contacts 224 are connected with the power conductors 202 in a similar manner to that described above. In some embodiments, a ruggedized tube may surround the capacitors 220 and their connections with the conductors 202 to provide additional protection from the environment and mechanical stresses.

Those skilled in this art will appreciate that jumper cables according to embodiments of the invention may lack optical fibers and provide power only (with corresponding power connectors). Alternatively, a hybrid jumper cable may have both power and fiber optic connectors rather than a hybrid connector as shown.

Figure 12:
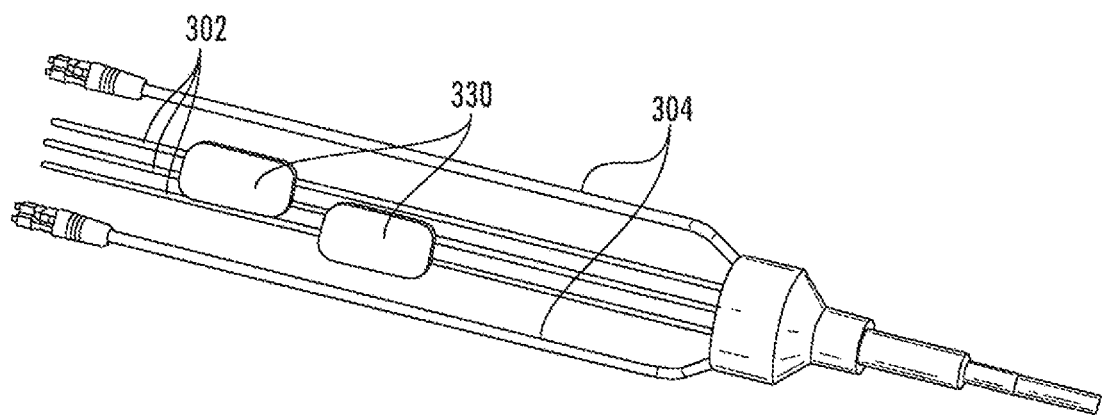
FIG. 12 is an enlarged partial perspective view of the OVP unit of the hybrid jumper cable of FIG. 10.
Figure 13:
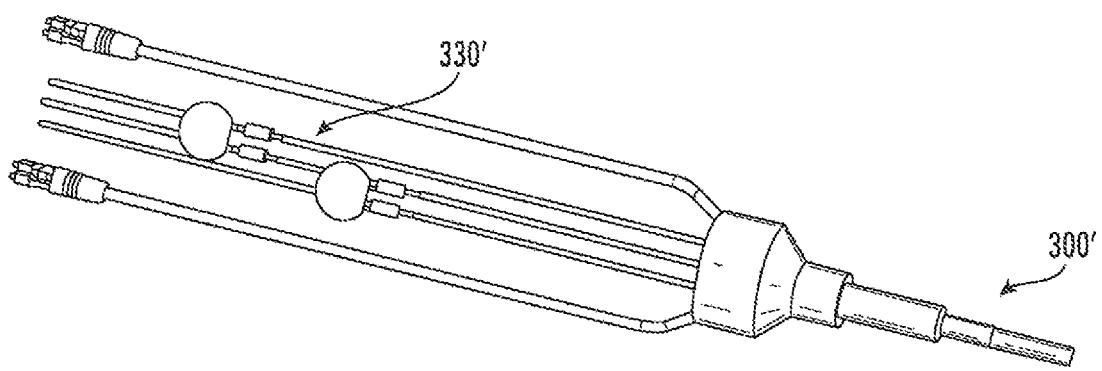
FIG. 13 is an enlarged perspective view of an alternative OVP unit for the hybrid jumper cable unit of FIG. 10.

Referring now to FIGS. 10-12, another embodiment of a hybrid jumper cable, designated broadly at 300, is shown therein. The hybrid jumper cable 300 includes three power conductors 302 and two optical fibers 304 residing within a jacket 306, and also includes a hybrid connector 310 at one end. Capacitors (not shown) reside within ruggedized tubes 340 (FIG. 11), which in turn reside within a conduit 312. As shown in FIG. 12, at the opposite end the hybrid cable 300 includes an OVP unit 330, which is connected to the power conductors 304 (one of which is a ground wire). A ruggedized tube 342 covers the OVP unit 330. In this instance the hybrid jumper cable 300 can provide overvoltage protection, rather than such capability being housed in the RRU or other equipment. Another embodiment of a hybrid jumper cable 300' shows an OVP unit 330' of a different configuration (see FIG. 13).

Figure 14:
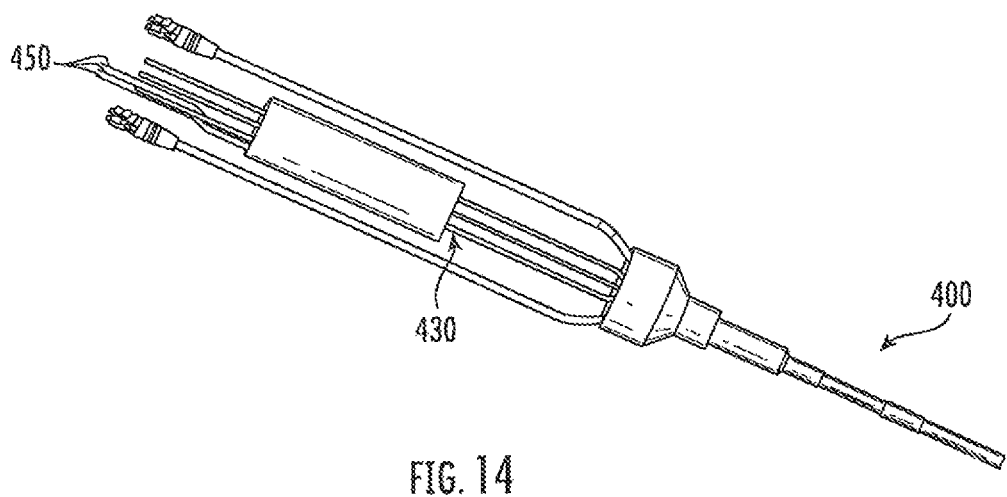
FIG. 14 is an enlarged partial perspective view of a hybrid jumper cable according to embodiments of the invention in which an OVP unit is connected to alarm wires.
Figure 15:
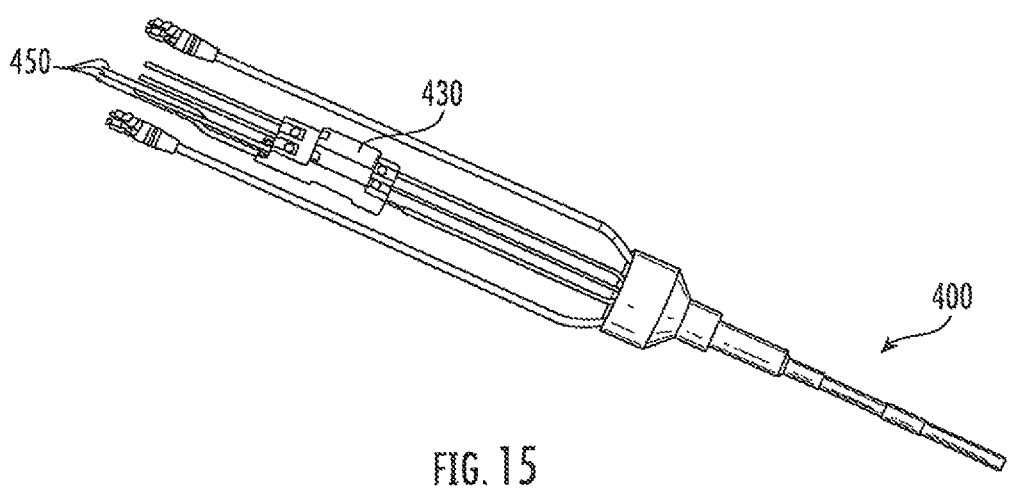
FIG. 15 is an enlarged partial perspective view of the hybrid jumper cable according to FIG. 14 with the ruggedized tube removed.

A still further embodiment of a hybrid jumper cable is illustrated in FIGS. 14 and 15 and designated broadly at 400. The hybrid jumper cable 400 is similar to the hybrid jumper cable 300 shown in FIGS. 10-12, with the exception that the OVP unit 430 is of a different configuration, and three alarm wires 450 are attached to the OVP unit 430. This configuration can provide a warning signal to an external alarm unit (not shown), such as an audio alarm or visual indicator.

Although jumper cables are discussed herein, the configuration could also be used in trunk cables or the like.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A hybrid jumper cable, comprising:
a pair of power conductors;
a pair of optical fibers;
a jacket surrounding the pair of power conductors and the pair of optical fibers;
a hybrid connector connected with the pair of power conductors and the pair of optical fibers;
a capacitor electrically connected to each of the pair of power conductors; and
a conduit attached to the hybrid connector, the capacitor residing in the conduit,
wherein the conduit is formed of a polymeric material, and
wherein the conduit includes a metallic shield.

2. The hybrid jumper cable defined in claim 1, wherein the capacitor includes a body and two contacts, each of the contacts in electrical contact with a respective power conductor.

3. The hybrid jumper cable defined in claim 2, wherein the contacts extend from a common end of the body of the capacitor.

4. The hybrid jumper cable defined in claim 3, wherein each of the contacts engages a respective power terminal of the hybrid connector.

5. The hybrid jumper cable defined in claim 4, wherein each of the contacts is crimped to the respective power terminal.

6. The hybrid jumper cable defined in claim 4, wherein the capacitor resides at least partially within a back body of the hybrid connector.

7. The hybrid jumper cable defined in claim 2, wherein the contacts extend from opposite ends of the body of the capacitor.

8. The hybrid jumper cable defined in claim 1, wherein the capacitor is a first capacitor, and wherein a second capacitor is connected between the power conductors.

9. The hybrid jumper cable defined in claim 2, wherein an engagement location in which one of the contacts engages a respective power conductor is covered with a shrink sleeve.

10. The hybrid jumper cable defined in claim 1, further comprising an overvoltage protection device connected to the power conductors and residing within the conduit.

11. A jumper cable, comprising:
a pair of power conductors;
a jacket surrounding the pair of power conductors;
a connector connected with the pair of power conductors;
a capacitor electrically connected to each of the pair of power conductors; and
a conduit attached to the connector, the conduit having a diameter greater than a diameter of the jacket, the capacitor residing in the conduit.

12. The jumper cable defined in claim 11, wherein the capacitor includes a body and two contacts, each of the contacts in electrical contact with a respective power conductor.

13. The jumper cable defined in claim 12, wherein the contacts extend from a common end of the body of the capacitor.

14. The jumper cable defined in claim 13, wherein each of the contacts engages a respective power terminal of the connector.

15. The jumper cable defined in claim 14, wherein each of the contacts is crimped to the respective power terminal.

16. A jumper cable, comprising:
    a pair of power conductors;
    a jacket surrounding the pair of power conductors;
    a connector connected with the pair of power conductors;
    an overvoltage device electrically connected to each of the pair of power conductors; and
    a conduit attached to the connector, the overvoltage device residing in the conduit.

17. The jumper cable defined in claim 16, further comprising a capacitor electrically connected to each of the pair of power conductors.

\* \* \* \* \*